(12) United States Patent
Kamasuka (10) Patent No.: US 10,831,422 B2
(45) Date of Patent: Nov. 10, 2020

(54) SYSTEM AND METHOD FOR TRANSMITTING AN INSTALLER TO A PRINTING APPARATUS VIA A PRINTING APPARATUS URI

(71) Applicant: CANON KABUSHIKI KAISHA, Tokyo (JP)

(72) Inventor: Atsushi Kamasuka, Matsudo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/626,414

(22) Filed: Jun. 19, 2017

(65) Prior Publication Data
US 2017/0371637 A1 Dec. 28, 2017

(30) Foreign Application Priority Data
Jun. 27, 2016 (JP) .................. 2016-126736

(51) Int. Cl.
*G06F 3/12* (2006.01)
*G06F 8/61* (2018.01)
*H04L 29/08* (2006.01)

(52) U.S. Cl.
CPC ............. *G06F 3/123* (2013.01); *G06F 8/61* (2013.01); *H04L 67/34* (2013.01)

(58) Field of Classification Search
CPC . G06F 3/1225; G06F 8/61; G06F 8/63; G06F 8/64; G06F 8/65; G06F 8/654; G06F 8/656; G06F 8/658; G06F 3/123; G06F 8/60–66; G06F 9/453; H04L 67/34
See application file for complete search history.

(56) References Cited

U.S. PATENT DOCUMENTS

| | | | |
|---|---|---|---|
| 7,136,174 B2* | 11/2006 | Chapin | G06F 3/1204 358/1.13 |
| 7,334,224 B2* | 2/2008 | Haga | G06F 8/65 717/168 |
| 8,429,644 B2* | 4/2013 | Kwon | G06F 8/60 717/174 |

(Continued)

FOREIGN PATENT DOCUMENTS

| | | |
|---|---|---|
| JP | 2004194284 A | 7/2004 |
| JP | 2011170465 A | 9/2011 |
| JP | 2014035752 A | 2/2014 |

OTHER PUBLICATIONS

Office Action issued in Japanese Appln. No. 2016-126736 dated Jul. 10, 2020.

*Primary Examiner* — Todd Aguilera
(74) *Attorney, Agent, or Firm* — Rossi, Kimms & McDowell LLP (57) ABSTRACT

The present information processing apparatus, in accordance with an operation input from an administrator, registers related information that relates to a predetermined application to be installed onto the information processing apparatus, and, in accordance with the registered related information, presents guide information for installing the predetermined application to a user via an operation screen of the information processing apparatus. Upon accepting a user input based on the guide information, installation information for installing the predetermined application is obtained from an installer provision server, and installation of the predetermined application is executed.

10 Claims, 9 Drawing Sheets

(56) References Cited

U.S. PATENT DOCUMENTS

| | | | |
|---|---|---|---|
| 9,191,073 B2* | 11/2015 | Sugimoto | H04B 5/0031 |
| 9,413,620 B2* | 8/2016 | Simpson | H04L 43/04 |
| 2003/0160988 A1* | 8/2003 | Chapin | G06F 3/1204 |
| | | | 358/1.13 |
| 2004/0061729 A1* | 4/2004 | Green | G06F 3/1204 |
| | | | 347/5 |
| 2004/0093598 A1* | 5/2004 | Haga | G06F 8/65 |
| | | | 717/173 |
| 2007/0245333 A1* | 10/2007 | Ferlitsch | G06F 8/65 |
| | | | 717/168 |
| 2010/0107152 A1* | 4/2010 | Kwon | G06F 8/60 |
| | | | 717/174 |
| 2011/0202913 A1 | 8/2011 | Nishimura | |
| 2014/0047432 A1* | 2/2014 | Michishita | G06F 8/65 |
| | | | 717/173 |
| 2014/0378112 A1* | 12/2014 | Sugimoto | H04B 5/0031 |
| | | | 455/418 |
| 2015/0134813 A1* | 5/2015 | Simpson | H04L 41/5061 |
| | | | 709/224 |

* cited by examiner

NEW REGISTRATION OF APPLICATION GUIDE

310

| APP NAME | AAApp |
|---|---|
| EXPLANATION | This app is awesome!! |
| INSTALLATION PACKAGE OBTAINMENT DESTINATION | http://*****.com/service?*** |

| TEMPORARY ACCESS DESTINATION URI | http://[device ip address]/app/AAApp |
|---|---|

320

330 — REGISTER

SYSTEM AND METHOD FOR TRANSMITTING AN INSTALLER TO A PRINTING APPARATUS VIA A PRINTING APPARATUS URI

BACKGROUND OF THE INVENTION

Field of the Invention

The present invention relates to an information processing apparatus that loads and operates an application program on embedded firmware that controls a device, a control method thereof, and a storage medium.

Description of the Related Art

There is a system that installs a separate loadable program (an application) on firmware that controls a device, to enable usage of various services. It is widely known that such systems are realized in devices such as smart phones or tablet type information terminals. However, in recent years there are systems for installing applications on apparatuses having smaller storage capacity, such as a multifunction peripheral for example, to provide additional functions or additional services.

In regards to installation of an application, in the case of iOS or Android, a method in which a user directly accesses the App Store or Google Play from their device to search for and install a desired application is typical. In contrast, in the case of a multifunction peripheral, there is a method in which a dealer serviceman or an administrator arranges and installs a required package and license based on a request by a customer. In addition, Japanese Patent Laid-Open No. 2011-170465 proposes a technique for simplifying the installation of an application by performing central control, as with an application distribution system.

However, there is a problem in the foregoing conventional technique as is recited below. In the case where there is a well-known established marketplace as with the App Store or Google Play, users would themselves actively search for and use a new application or service. Meanwhile, if that is not the case, it is typically difficult to make the user recognize a new application or service, and there is inevitably a high hurdle for the introduction of a new service. Even if a user recognizes a desired service, the effort to download a necessary installer and perform an installation on a desired device is cumbersome. Specifically, in addition to the location of an installer often differing for each service, there is a necessity to search for and designate a desired device for the installation on the network. Accordingly, a threshold for a general user to perform this themselves is high, and this remains one factor why usage of the service does not spread.

In addition, for a multifunction peripheral used in an office or the like, there are cases where a direct connection to the Internet is not permitted due to reasons such as an organization's security policy, and thus directly accessing an external service from the operation panel of a device to make an installation is difficult.

SUMMARY OF THE INVENTION

The present invention enables realization of a mechanism for causing a user to recognize a new application or service through an operation screen for operating an information processing apparatus.

One aspect of the present invention provides an information processing apparatus comprising: a memory device that stores a set of instructions; and at least one processor that executes the instructions to: present guide information for installing an application on the information processing apparatus to a user; in a case where an external apparatus accesses the information processing apparatus based on access information included in the guide information, transmit to the external apparatus redirect information for causing the external apparatus to access a server storing the application; receive from the external apparatus an installer for the application that the external apparatus obtained from the server; and use the installer to install the application onto the information processing apparatus.

Another aspect of the present invention provides a control method of an information processing apparatus, the information processing apparatus comprising a memory device that stores a set of instructions; and at least one processor that executes the instructions, the control method comprising: presenting guide information for installing an application onto the information processing apparatus to a user; in a case where an external apparatus accesses the information processing apparatus based on access information included in the guide information, transmitting to the external apparatus redirect information for causing the external apparatus to access a server storing the application; receiving from the external apparatus an installer for the application that the external apparatus obtained from the server; and using the installer to install the application onto the information processing apparatus.

Still another aspect of the present invention provides a non-transitory computer-readable storage medium storing a computer program for causing a computer to execute a control method of an information processing apparatus, the information processing apparatus comprising a memory device that stores a set of instructions; and at least one processor that executes the instructions, the control method comprising: presenting guide information for installing an application onto the information processing apparatus to a user; in a case where an external apparatus accesses the information processing apparatus based on access information included in the guide information, transmitting to the external apparatus redirect information for causing the external apparatus to access a server storing the application; receiving from the external apparatus an installer for the application that the external apparatus obtained from the server; and using the installer to install the application onto the information processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, and the numerical expressions and numerical values set forth in these embodiments do not limit the scope of the present invention unless it is specifically stated otherwise.

First Embodiment

<System Configuration>

Below, description will be given for a first embodiment of the present invention. Firstly, with reference to FIG. 1, description is given regarding a system configuration of an information processing system according to the present embodiment.

Figure 1:
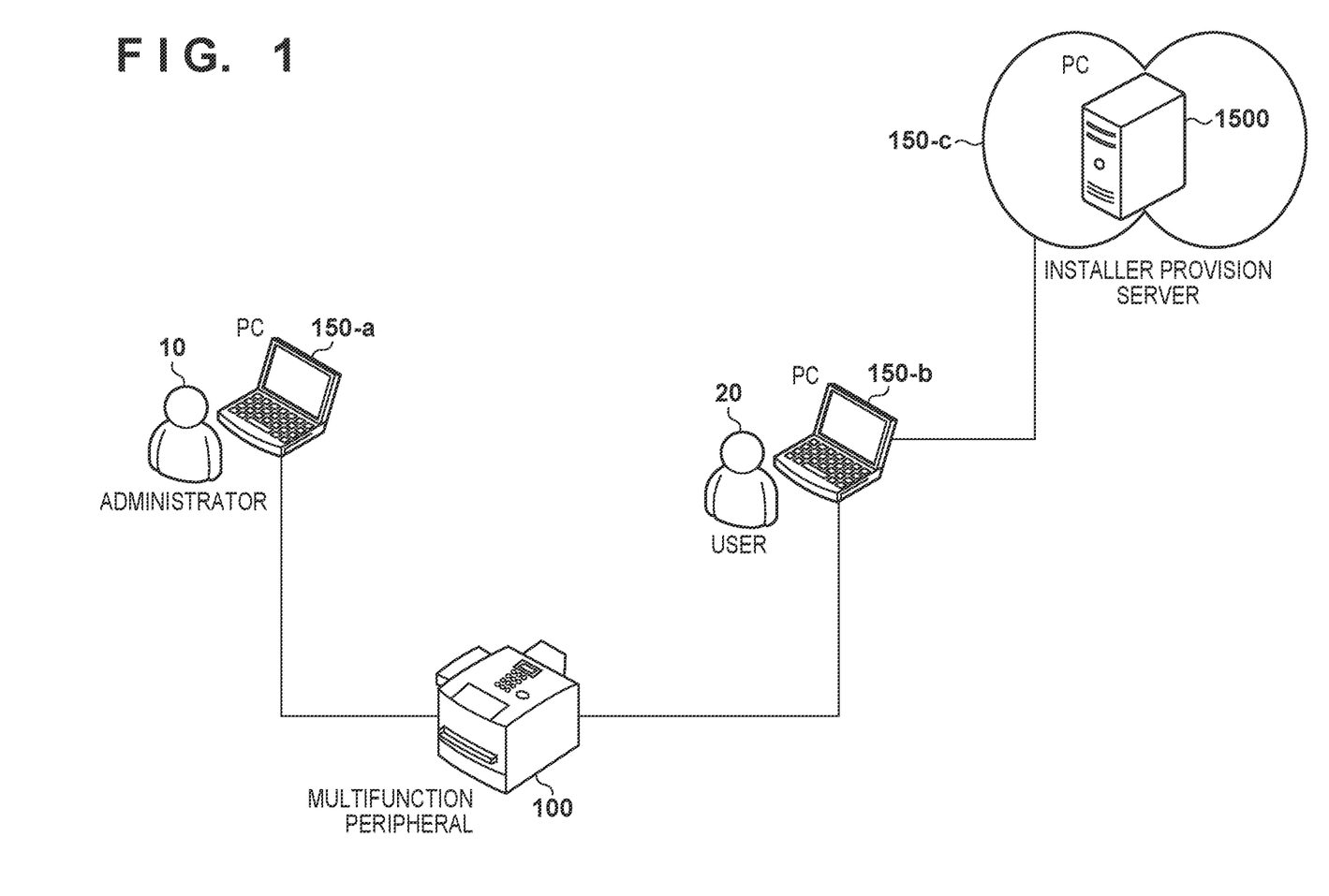
FIG. 1 is a view for illustrating an example of a configuration of an information processing system according to an embodiment.

The present information processing system is configured by including a multifunction peripheral 100 that is an image processing apparatus, a PC 150-a, a PC 150-b, and a PC 150-c (an installer provision server 1500). The PC 150-a is used by an administrator 10 who creates a guide button for an application. The PC 150-b is used by a user 20 who performs work to install an application. The installer provision server 1500 provides, for example, a program of an application to be installed. Note that an application is abbreviated as an app below.

The administrator 10 is a person who uses the PC 150-a to access the multifunction peripheral 100 and register/manage a guide function for an app. The administrator 10 may be a person in charge for a vendor, a person in charge for a seller or a dealer, an IT administrator for an organization, or the like. The user 20 is a typical user of the multifunction peripheral 100, and can use the PC 150-b to perform an installation of an app in accordance with a guide function that the administrator 10 has registered. When the user 20 installs an app, in the background the PC 150-b accesses the installer provision server 1500, obtains an installer package from the installer provision server 1500, and installs it on the multifunction peripheral 100. Detailed explanation is given later.

<Hardware Configuration>

Figure 2:
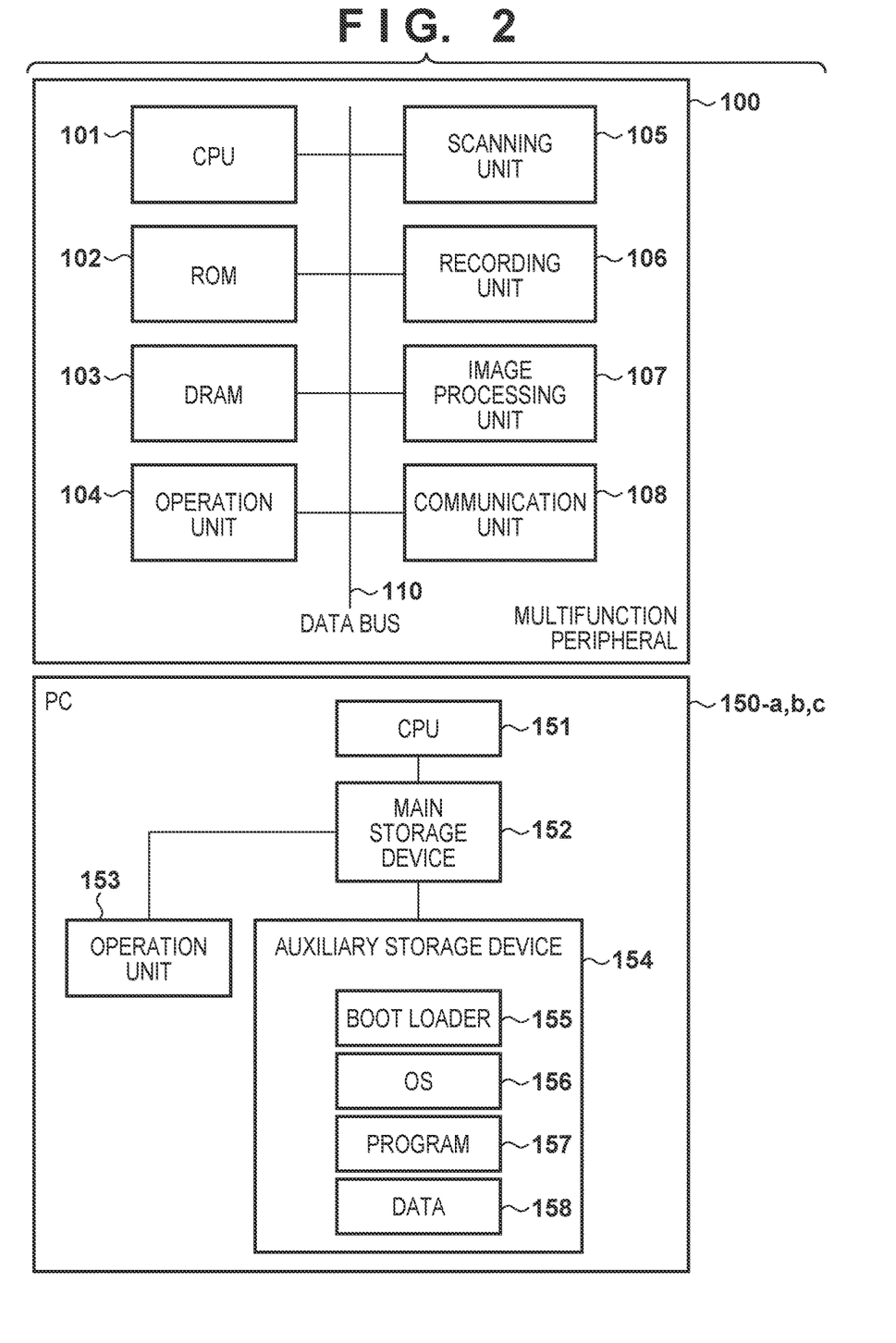
FIG. 2 is a view for illustrating an example of a hardware configuration of the information processing system according to an embodiment.

Next, with reference to FIG. 2, explanation is given regarding examples of hardware configurations of the multifunction peripheral 100 and a PC 150. Because the PCs 150-a, 150-b, and 150-c have the same configuration, they are abbreviated as the PC 150 below.

The multifunction peripheral 100 is provided with a CPU 101, a ROM 102, a DRAM 103, an operation unit 104, a scanning unit 105, a recording unit 106, an image processing unit 107, and a communication unit 108. The CPU 101 is a system control unit, and comprehensively controls the apparatus overall. The ROM 102 is configured by a flash memory such as an eMMC (Embedded Multi Media Card), and stores a control program for the CPU. Additionally, it also stores setting values, image data, and the like which must not disappear when power is OFF. In addition, the ROM 102 also stores application program data. The ROM 102 has a much smaller capacity than the memory capacity held by a device such as a personal computer. The DRAM 103 is a volatile memory for storing program control variables or the like. It can temporarily save image data to be processed, or the like.

The operation unit 104 is an interface unit for a user that displays information from within the device. The scanning unit 105 is an apparatus for reading image data from an original, outputting the image data, and converting it to binary data. The multifunction peripheral 100 can provide an image transmission function for transmitting to an external apparatus image data of an image read from an original by using the scanning unit 105. The image data may be stored in a memory of the multifunction peripheral 100.

The recording unit 106 is an apparatus for outputting image data to a recording sheet. The image processing unit 107 performs encoding and decoding processing of image data handled by the image transmission function. The communication unit 108 is an interface unit for the device and an external communication network. This includes a network communication unit that is an interface to a network, and a web service function is provided through this interface. The components are connected to be able to intercommunicate via a data bus 110.

The PC 150 includes a CPU 151, a main storage device 152, an auxiliary storage device 154, and an operation unit 153. The auxiliary storage device 154 stores a boot loader 155, an OS 156, a program 157, and data such as data 158. The CPU 151 is a processing apparatus for executing the boot loader 155, the OS 156, the program 157, or the like. The main storage device 152 is for example a memory for loading and temporarily storing the OS 156, the program 157, the data 158, and the like which are used by the CPU 151. The auxiliary storage device 154 is a nonvolatile storage apparatus. The boot loader 155 is a program that is first executed when the apparatus is activated.

<ROM Configuration>

Figure 8:
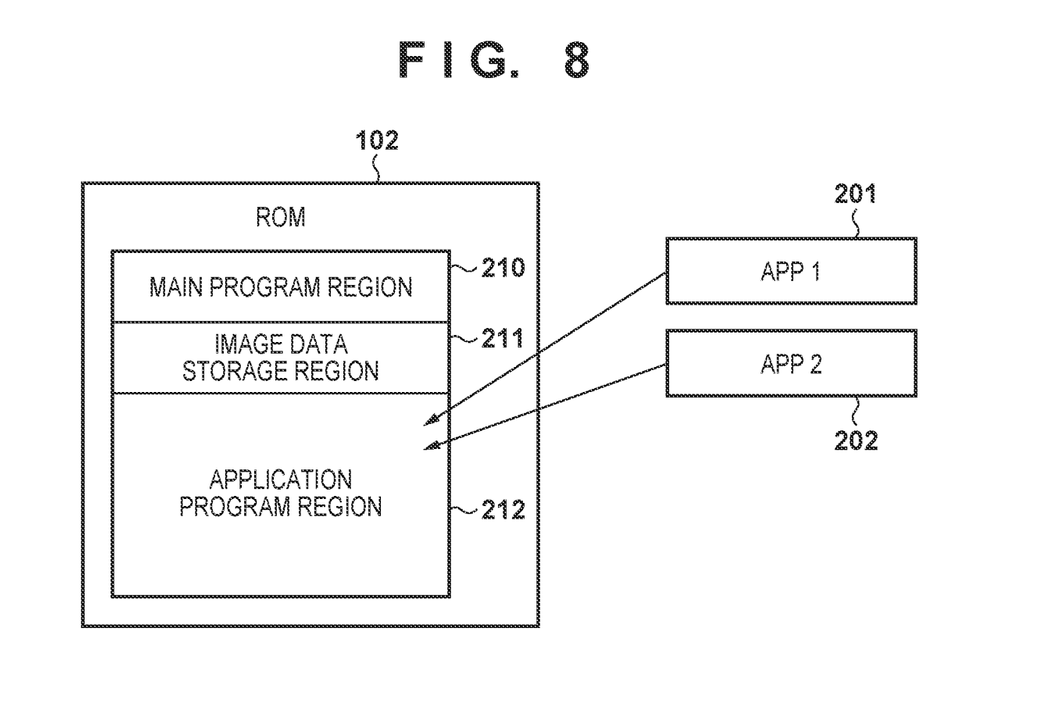
FIG. 8 is a view illustrating a region, in which to install an app, in a ROM (eMMC) of the image processing apparatus according to an embodiment.

Next, with reference to FIG. 8, explanation is given details of the ROM 102 in the multifunction peripheral 100. The ROM 102, which is an eMMC, is divided into a plurality of regions in accordance with an intended use. As illustrated in FIG. 8, it is divided into a plurality of regions, such as a main program region 210 that is for causing the main body of the multifunction peripheral 100 to operate, or an image data storage region 211 in which a received image is saved. Furthermore, an application program region 212 for causing application programs to operate is also set as a region. In this region it is possible to install a plurality of applications, such as an app 1 (reference numeral 201) and an app 2 (reference numeral 202), and cause them to operate.

<Example of Registration Screen>

Figure 3:
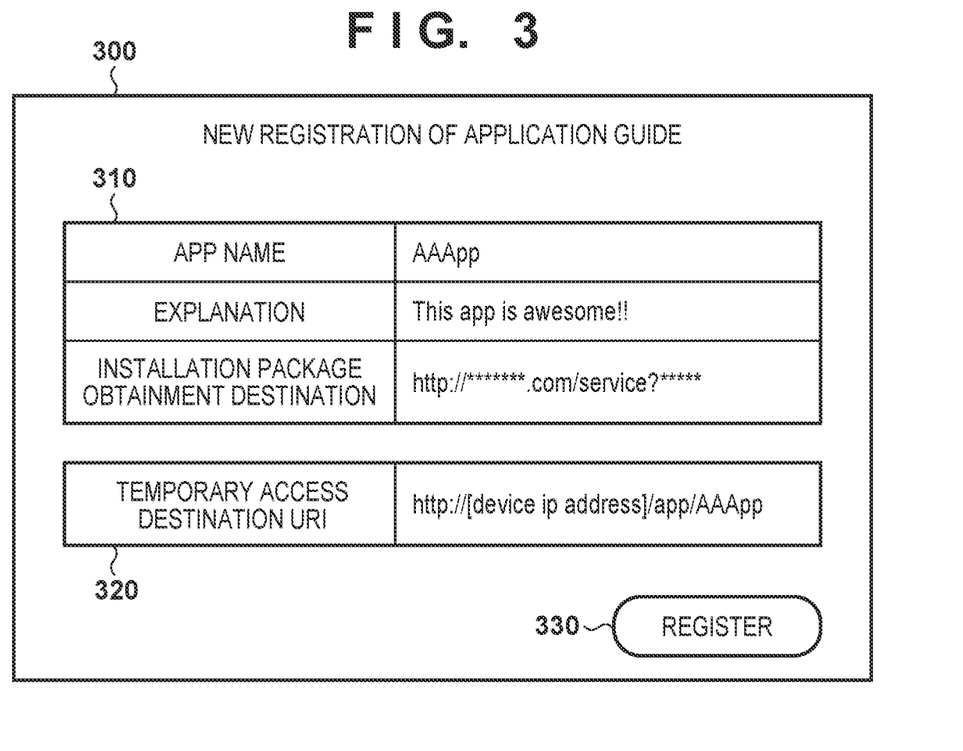
FIG. 3 is a view for illustrating an example of a screen for registering information of an application to a guide function, according to an embodiment.

Next, with reference to FIG. 3, explanation is given regarding an example of a screen for when registering, to a guide function, information of app that the administrator 10 wishes to improve recognition of and promote usage among users. A registration screen 300 is displayed on a Web browser of the PC 150-a. Here, as indicated by reference numeral 310, it is possible to set an app name, an explanation of the app, and a URI of a site for obtaining an installer for the app. Similarly, configuration may be taken so that a URI of a site for obtaining data such as Terms and Conditions for installation or usage of the app can be set.

From the app name set in reference numeral 310 and an IP address of the device, information of a "temporary access destination URI" to indicate to a user is automatically generated and is displayed together with the screen (reference numeral 320). For the name or the explanation of the app set in reference numeral 310, it is desirable for them to have high appeal and be easily understood by a user.

Here, by pressing the registration button of reference numeral 330, guide information of the target app is stored in the ROM 102. At this point, as a response to an HTTP request to the temporary access destination URI, a redirect program (redirect information) that indicates an installation package obtainment destination URI for the app is simultaneously generated by the CPU 101, and stored in the ROM 102. Note that this registration work can be performed via the operation unit 104 of the multifunction peripheral 100.

<Registration Processing>

Figure 9:
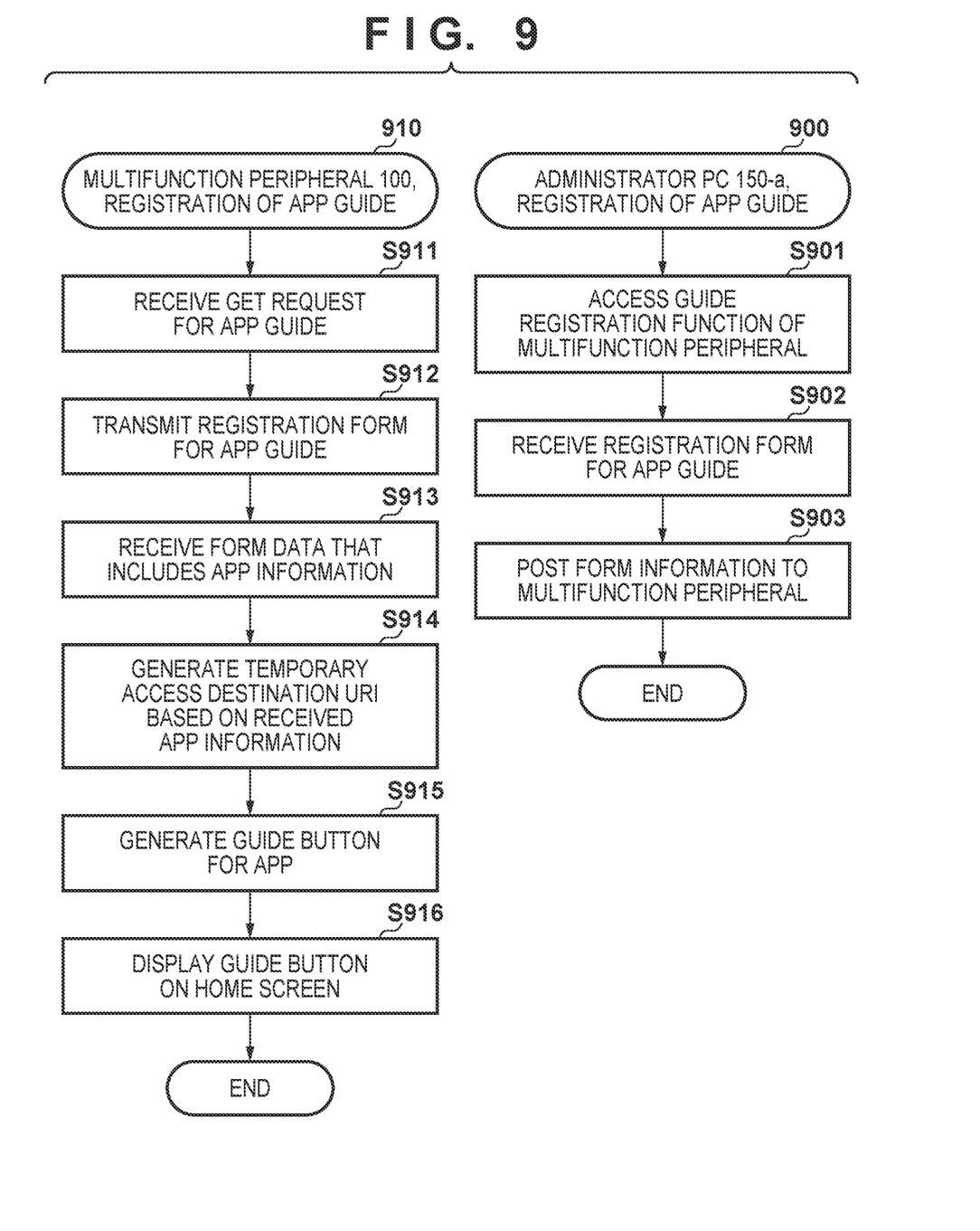
FIG. 9 is flowcharts illustrating processing procedures in a multifunction peripheral and an administrator's PC, according to an embodiment.

Next, with reference to FIG. 9, explanation is given regarding a processing procedure for when the administrator 10 registers a guide function of the multifunction peripheral 100 from a Web browser of the PC 150-*a*. A flowchart 900 indicates a processing procedure of a PC 150-*a* that the administrator uses, and a flowchart 910 indicates a processing procedure of the multifunction peripheral 100. Explanation is given below of the two flowcharts, concurrently in chronological order. Note that there is no intention to limit the present invention by the processing being performed in the order explained below.

In step S901, the CPU 151 of the PC 150-*a* detects a user input via the operation unit 153, accepts access to a guide registration function of the multifunction peripheral 100, and accesses the multifunction peripheral 100. Meanwhile, in step S911, the CPU 101 of the multifunction peripheral 100 accepts a request from the PC 150-*a*, and in step S912 transmits guide registration form information to the PC 150-*a*.

In step S902, the CPU 151 of the PC 150-*a* receives the registration form information from the multifunction peripheral 100, accepts information of an app that the administrator wishes to register via input of a guide registration form, and in step S903 transmits the accepted information to the multifunction peripheral 100.

Meanwhile, in step S913, the CPU 101 of the multifunction peripheral 100 receives form data that includes the app information from the administrator, in step S914 generates a temporary access destination URI based on the received app information, and in step S915 generates a guide button for the app. Note that configuration may be taken such that the information of the temporary access destination URI is of a configuration that is generated based on a script or the like embedded in advance in the form when the administrator inputs the form, and is received by the multifunction peripheral 100 as a portion of the form information. Subsequently, in step S916 the CPU 101 displays the guide button of the registered app on a home screen of the multifunction peripheral 100, and terminates the processing.

Figure 4:
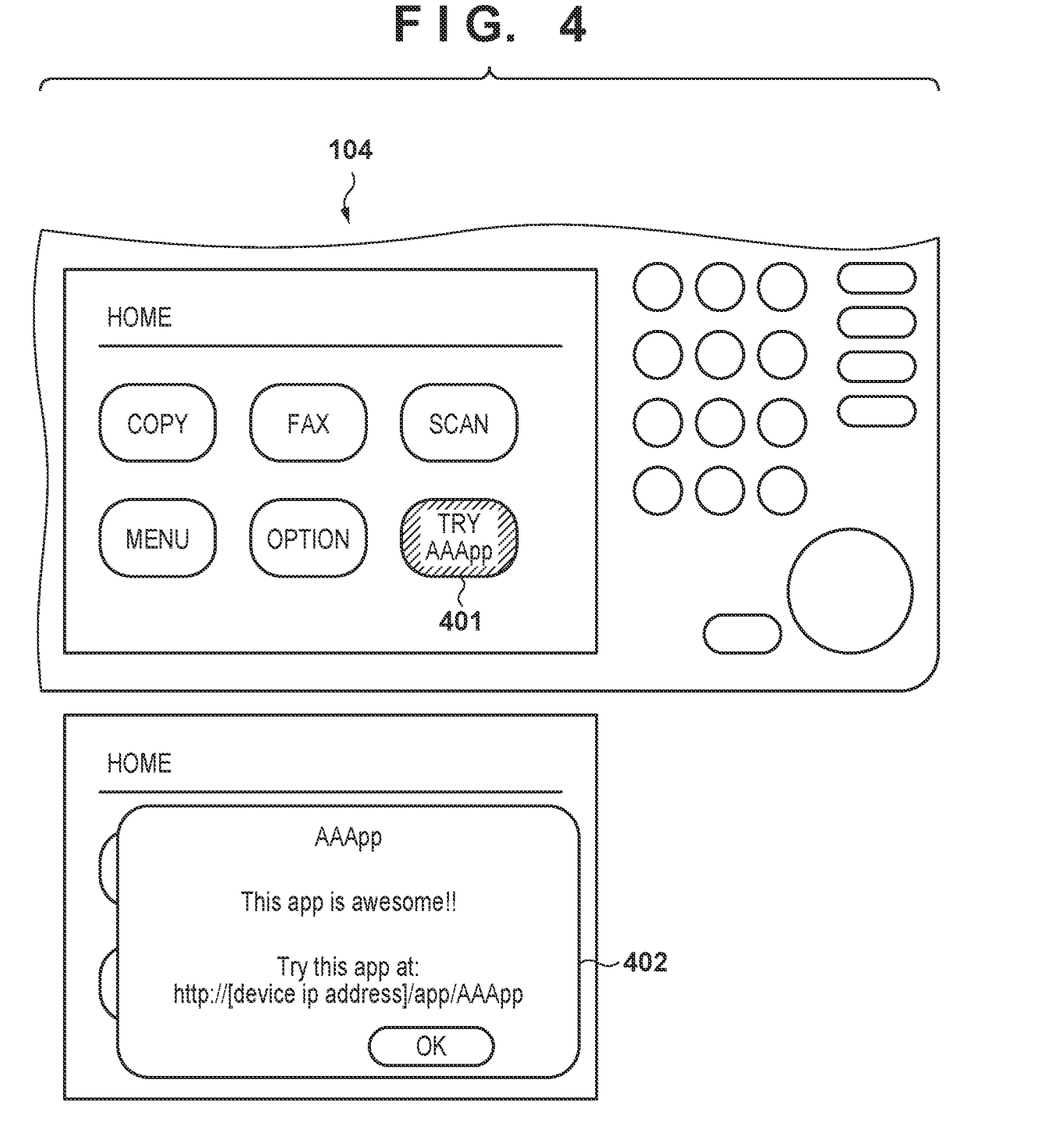
FIG. 4 is a view for illustrating an example of a screen displayed on an operation unit (a Web browser) of an image processing apparatus according to an embodiment.

In this way, when the app information is registered in the guide function, a guide button 401 of the app is displayed on the operation unit 104 of the multifunction peripheral 100, as illustrated on FIG. 4. When a user presses the guide button 401, as illustrated by reference numeral 402, the information 310 of the app that the administrator inputted by the previously described registration work, and the temporary access information 320 that was automatically generated are displayed on a pop-up screen or the like. By this, a user of the multifunction peripheral 100 can easily recognize a new app or service, and it is easy to transition to a usage procedure in accordance with the displayed temporary access information to use it.

<Sequence>

Figure 5:
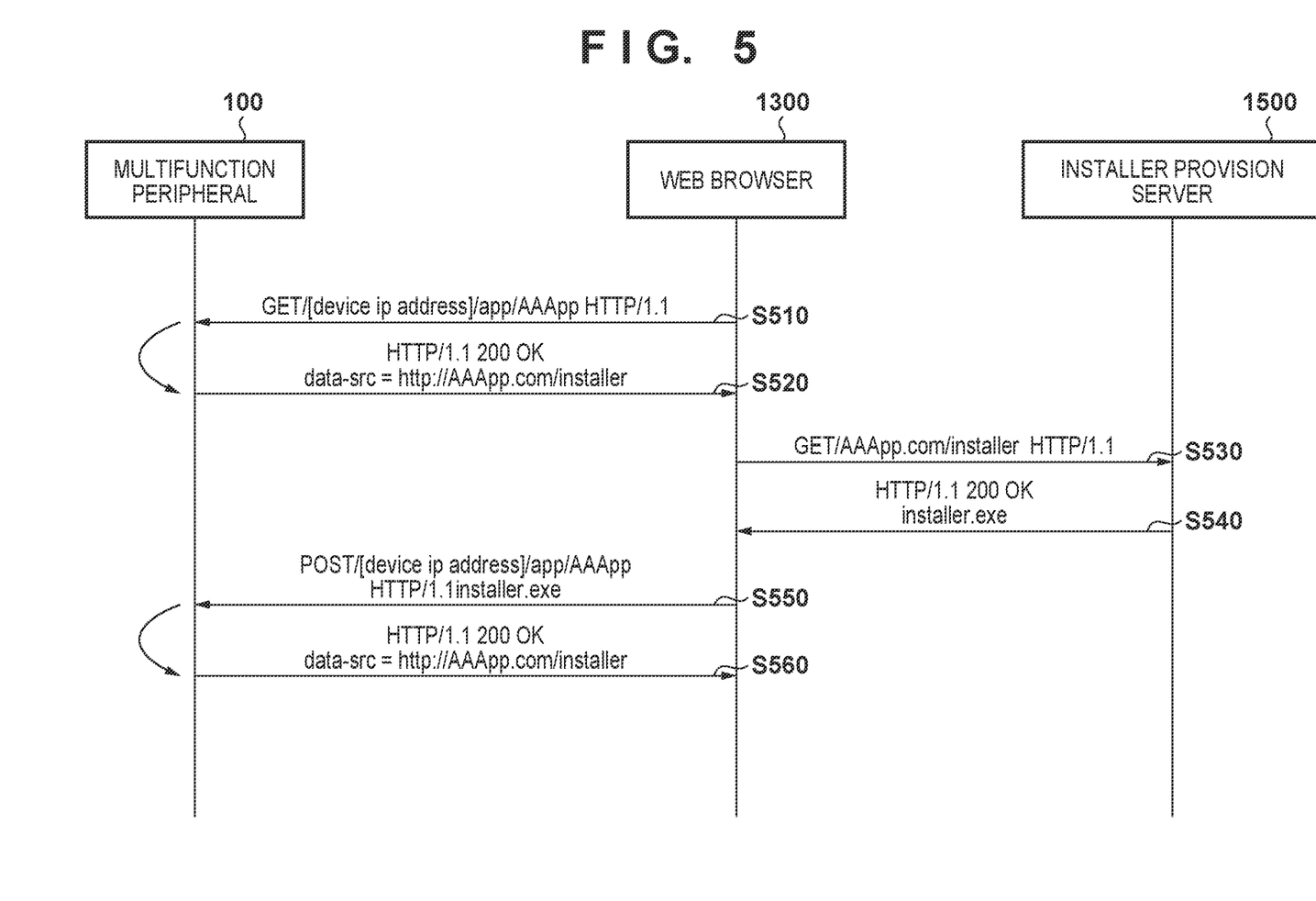
FIG. 5 is a view for illustrating a sequence in the information processing system according to an embodiment.

Next, with reference to FIG. 5, explanation is given regarding a sequence of the present information processing system for when the user 20 accesses a Web browser 1300 of the PC 150-*b* based on the temporary access information. Please take note that, because the temporary access information is generated from the app name and the IP address of the multifunction peripheral 100, what the user accesses is the multifunction peripheral 100. In addition, because the multifunction peripheral 100 is not limited to an environment in which it is possible to access the Internet, a user uses the Web browser 1300 of the PC 150-*b*, which can access the web service function of the multifunction peripheral 100, to perform the work.

Firstly, in step S510, having accepted a user operation, the Web browser 1300 of the PC 150-*b* accesses the multifunction peripheral 100 in accordance with the temporary access destination URI information that the user confirmed by the pop-up screen of reference numeral 402. In step S520, the web service function of the multifunction peripheral 100, having received the HTTP request, operates a redirect program generated in accordance with the registration processing of reference numeral 330. In accordance with the program, response data that includes an installation package obtainment destination URI of the installer provision server 1500 is replied to the Web browser 1300.

Next, in step S530, the Web browser 1300 accesses the installer provision server 1500 in accordance with the replied installation package obtainment destination information URI, and in step S540, obtains the installation package from the installer provision server 1500. Next, in step S550, the Web browser 1300 transmits (transfers) the installation package obtained in step S540 to the multifunction peripheral 100 in a POST request, and executes installation processing. In step S560, the multifunction peripheral 100 returns an installation result for the installation package included in the POST request to the Web browser 1300, and terminates the processing.

<Installation Processing>

Figure 10:
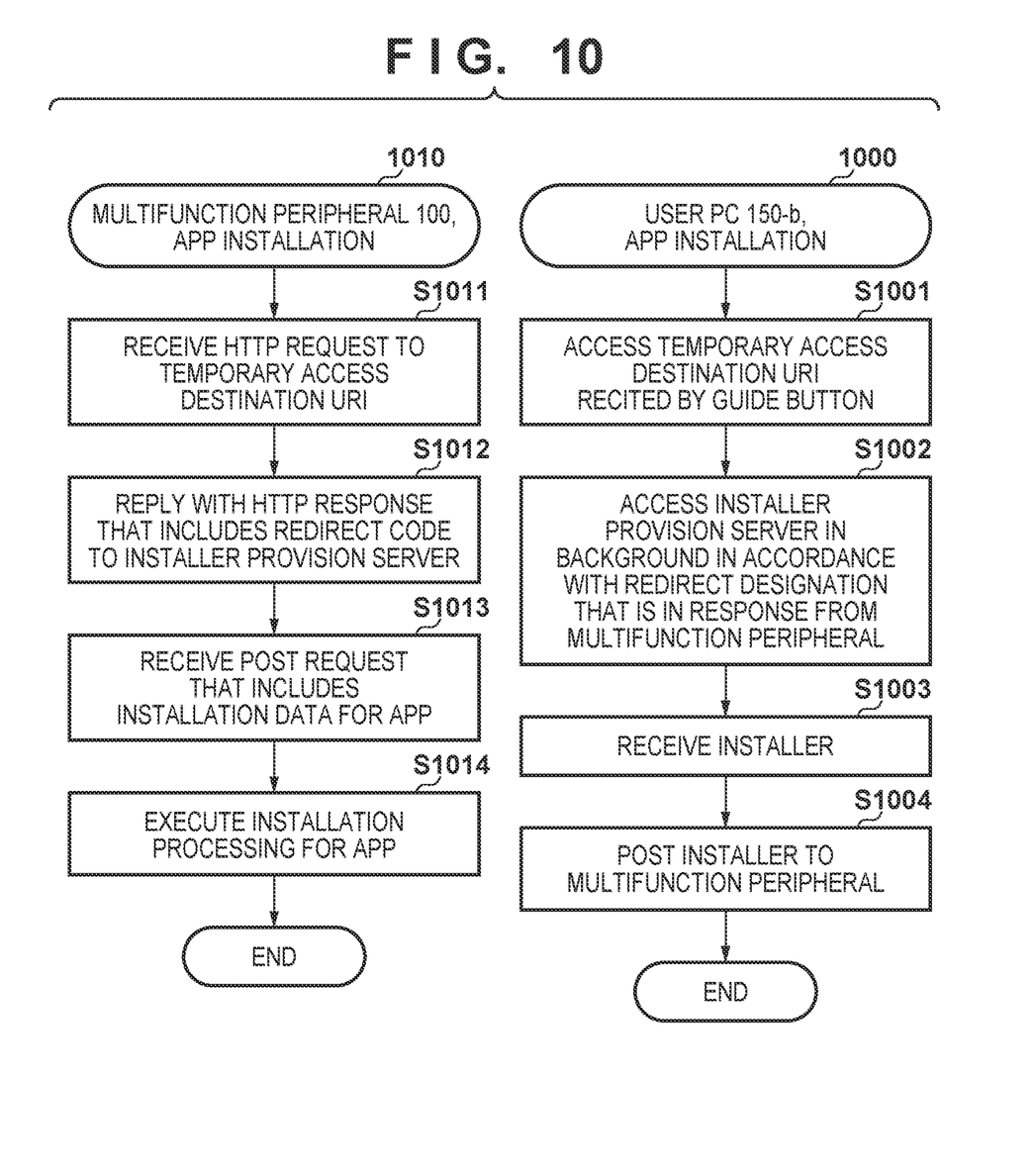
FIG. 10 is flowcharts illustrating processing procedures in a multifunction peripheral and a user's PC, according to an embodiment.

Next, with reference to FIG. 10, explanation is given regarding detailed processing procedures for each device in the sequence above. A flowchart 1000 indicates a processing procedure of a PC 150-*b* that a user uses, and a flowchart 1010 indicates a processing procedure of the multifunction peripheral 100. Explanation is given below of the two flowcharts, concurrently in chronological order. Note that there is no intention to limit the present invention by the processing being performed in the order explained below.

In step S1001, the CPU 151 of the PC 150-*b* accesses the temporary access destination URI described on the guide button, in accordance with an operation by the user 20 from the Web browser of the PC 150-*b*. Specifically, the CPU 151 transmits an HTTP request to the multifunction peripheral 100.

Meanwhile, in step S1011, the CPU 101 of the multifunction peripheral 100 receives the HTTP request, generates HTTP response data that includes an installer obtainment destination URI of the installer provision server 1500 for the app, and in step S1012 replies with this HTTP response data to the PC 150-*b*. Subsequently, in step S1002, the CPU 151 of the PC 150-*b* accesses the installer provision server 1500 for the app in the background based on installer obtainment destination URI information included in the received HTTP response data. Next, in step S1003, the CPU 151 obtains an installer for the target app from the installer provision server 1500. Next, in step S1004, the CPU 151, in accordance with an operation by the user 20, uses a web service function of the multifunction peripheral 100 to transmit (transfer) the obtained installer in a POST request, execute installation processing for the app in the multifunction peripheral 100, and terminates processing.

Meanwhile, in step S1013, the CPU 101 receives the POST request that includes installation data of the app, in step S1014 executes installation processing of the app, transmits an execution result to the PC 150-b, and terminates processing.

Figure 6:
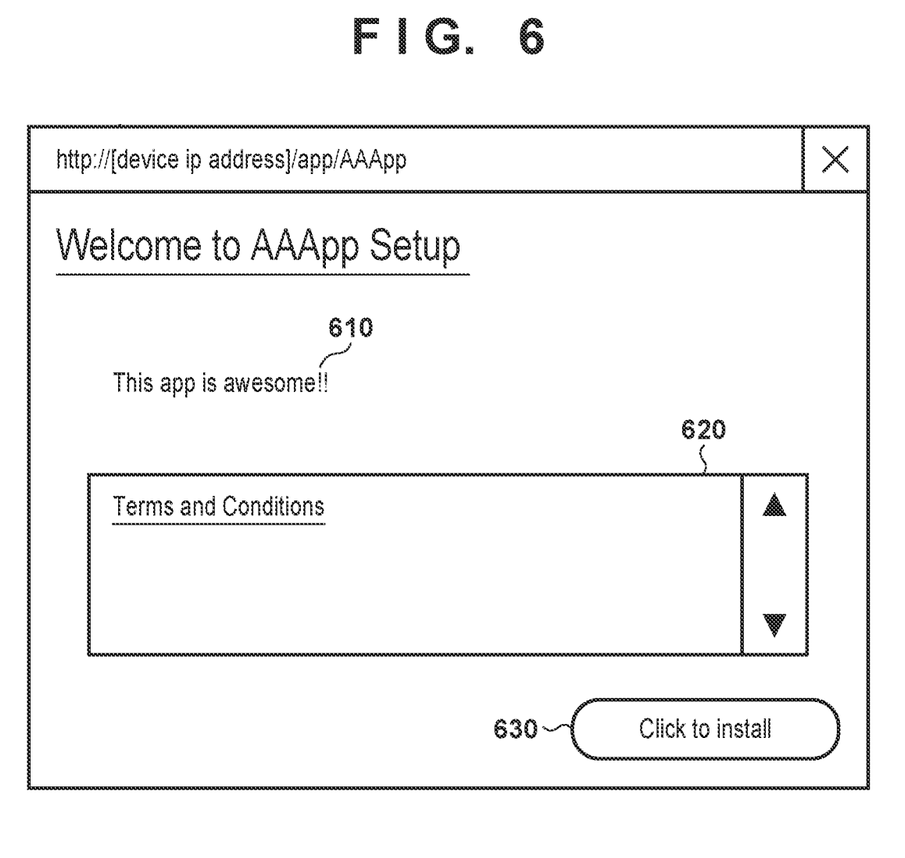
FIG. 6 is a view for illustrating an example of a screen displayed on the operation unit (Web browser) of the image processing apparatus according to an embodiment.

Here, with reference to FIG. 6, explanation is given regarding an example of a display screen of the Web browser 1300 of the PC 150-b, at a stage where the obtainment of the installation package in step S540 and step S1003 has completed. In reference numeral 610, the name and an explanation of the app is displayed. Depending on the case, configuration may be taken such that Terms and Conditions are obtained from the installer provision server 1500 at the time of step S530, and displayed in reference numeral 620. When the user 20 presses the installation start button 630, in other words, when an installation start time is accepted from a user, installation processing of step S550 is executed.

Figure 7:
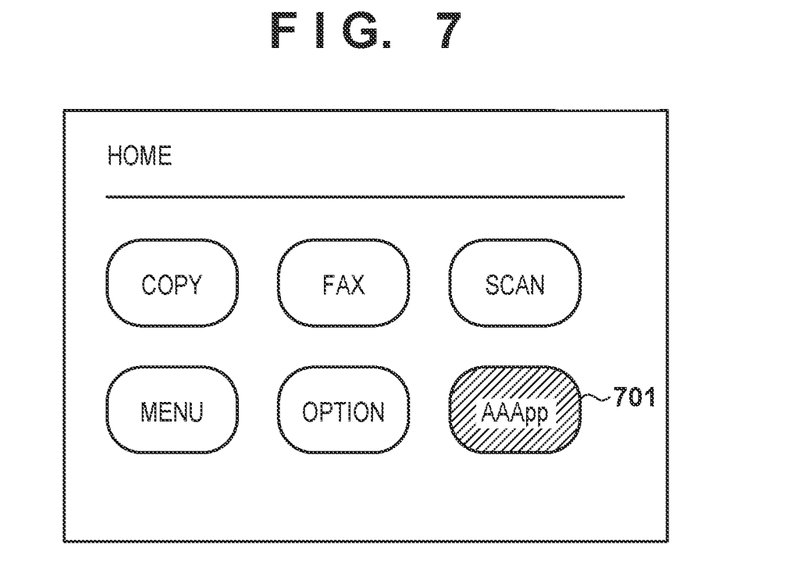
FIG. 7 is a view for illustrating an example of a screen displayed on the operation unit (Web browser) of the image processing apparatus according to an embodiment.

FIG. 7 is a view illustrating that a label of a guide button has changed after the installation of an app. Once an app is installed, because a guide function is unnecessary, it is desirable to display after changing the label of the button, or set the button itself to non-display.

When displaying the home screen of the operation unit 104, the multifunction peripheral 100 compares apps that are registered in the guide function and installed apps, and judges whether there is a need to present guide information to a user. Accordingly, if there is a registration in the guide function but an app corresponding to the relevant guide information is already installed, the CPU 101 can set the guide button to non-display, or display the guide button after changing the label. In addition, configuration may be taken so as to display the guide button by a grayed out display, so that it cannot be selected. In such a case, the button 701 is used with an intended use for activating and using the app. Thereby, it is possible to avoid a display of an unnecessary guide button, and reduce complications provided to users.

As explained above, an information processing apparatus (a printing apparatus) according to the present embodiment registers related information that relates to a predetermined application to be installed to the information processing apparatus in accordance with an operation input from an administrator. Furthermore, the information processing apparatus presents to a user guide information for installing the predetermined application to an operation screen of the information processing apparatus, in accordance with related information that has been registered. Subsequently, upon accepting a user input based on the guide information, the information processing apparatus obtains installation information for installing the predetermined application from an installer provision server, and executes installation of the predetermined application. In this way, in the present embodiment, in a case where a well-known marketplace such as the App Store or Google Play is not present, and in the situation where an information processing apparatus that is an installation destination is not directly connected to the Internet, it is possible to achieve the following effects. Specifically, even in such a case, it is possible to make an appeal to a user directly to have them recognize a new app or service, via the operation screen of the apparatus.

In addition, even in a case where an obtainment destinations of installation packages differ in accordance with a service provision source, it is possible to execute installation processing in accordance with a common procedure. Furthermore, work is easy for a user as they do not need to search for a device on which to perform an installation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-126736 filed on Jun. 27, 2016, which is hereby incorporated by reference herein in its entirety.

What is claimed is:

1. A control method of an information processing system including a printing apparatus and an external apparatus, the printing apparatus comprising an operation unit; a memory device that stores a set of instructions; and one or more processors that executes the instructions, the control method comprising:

in the printing apparatus, displaying, on the operation unit, a button having a name of an application that can be installed on the printing apparatus;

in the printing apparatus, displaying a URI of the printing apparatus according to selection of the button;

in the external apparatus, accessing to the printing apparatus according to reception of the URI of the printing apparatus;

in the printing apparatus, transmitting, to the external apparatus, a URI of a server in which the application is stored, using a redirect program for the access; and in the external apparatus, accessing the server according to reception of the URI of the server, and receiving an installer of the application from the server, displaying the information of the application on the operation unit of the external apparatus, and transmitting the installer to printing apparatus according to reception of an instruction for installing the application.

2. The control method according to claim 1, further comprising:

in the printing apparatus, executing a process of installing the application on the printing apparatus according to reception of the installer.

3. The control method according to claim 2, further comprising:

in the printing apparatus, updating a display of the button according to execution of the process of installing the application.

4. The control method according to claim 2, further comprising:

in the printing apparatus, setting the displayed button to non-display according to execution of the process of installing the application.

5. An information processing system including a printing apparatus and an external apparatus, the printing apparatus comprising:

an operation unit;

a memory device that stores a set of instructions; and one or more processors that execute the instructions to:

display, on the operation unit, a button having a name of an application that can be installed on the printing apparatus; and display a URI of the printing apparatus according to selection of the button, wherein the external apparatus accesses the printing apparatus according to reception of the URI of the printing apparatus, the printing apparatus transmits, to the external apparatus, a URI of a server in which the application is stored, using a redirect program for the access, and the external apparatus accesses the server according to reception of the URI of the server and receives an installer of the application from the server, displays the information of the application on the operation unit of the external apparatus, and transmits the installer to the printing apparatus according to reception of an instruction for installing the application.

6. The printing apparatus according to claim 5, wherein the one or more processors further executes the instructions to register the name of the application and the URI of the printing apparatus, in the printing apparatus, and displays the registered name of the application to a user.

7. The printing apparatus according to claim 5, wherein the printing apparatus is a multifunction peripheral (MFP).

8. The printing apparatus according to claim 5, wherein the printing apparatus further executes a process of installing the application on the printing apparatus according to reception of the installer.

9. The printing apparatus according to claim 8, wherein the printing apparatus updates a display of the button according to execution of the process of installing the application.

10. The printing apparatus according to claim 8, wherein the printing apparatus sets the displayed button to non-display according to execution of the process of installing the application.

* * * * *